Figure 4:
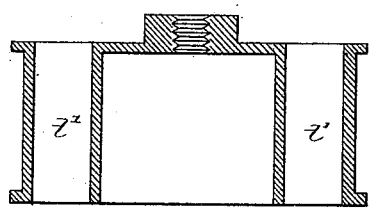

(No Model.) 2 Sheets—Sheet 1.
C. M. LUNGREN.
REGENERATIVE GAS LAMP.
No. 350,438. Patented Oct. 5, 1886.
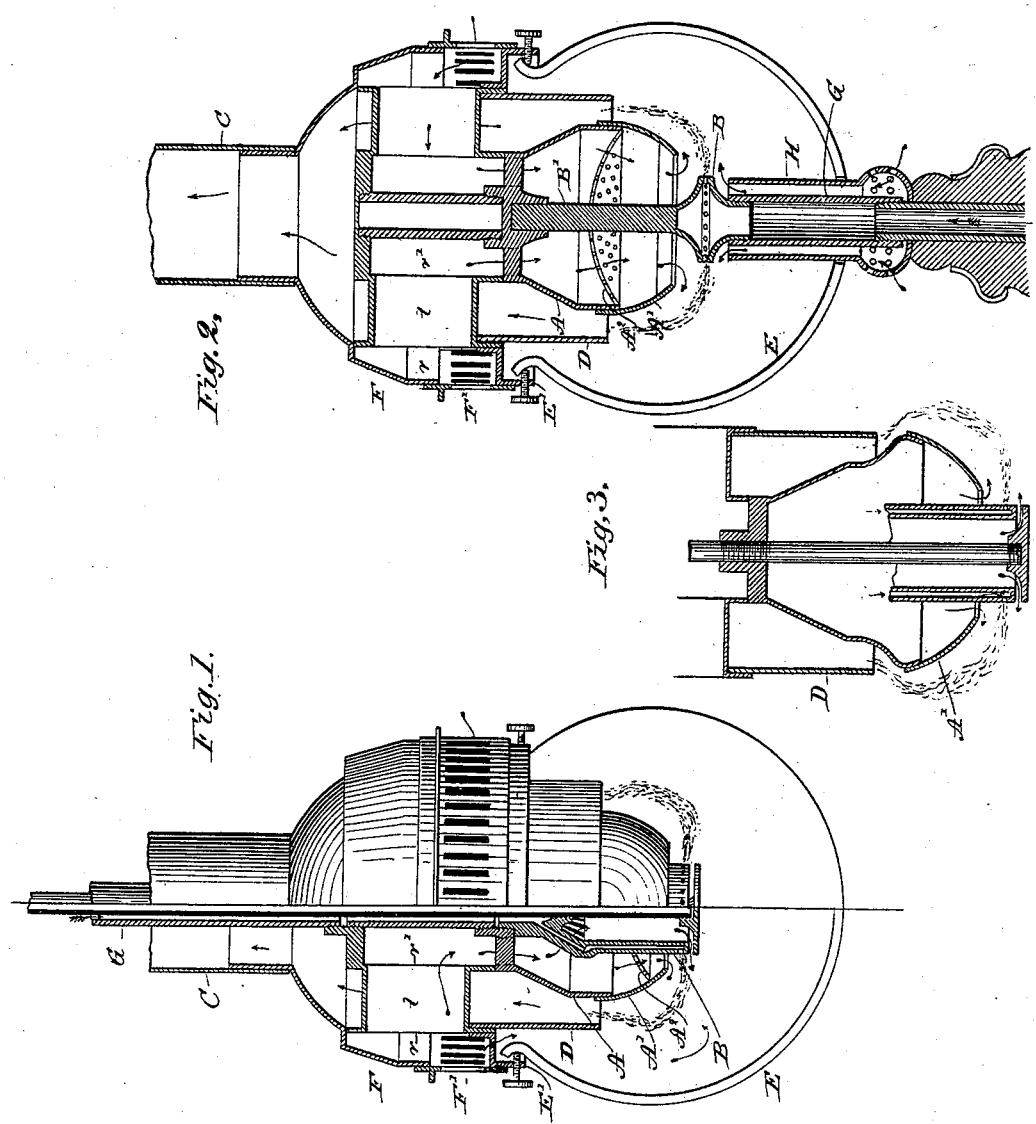
Witnesses:
Inventor:
C. M. Lungren
By his Attorney:

(No Model.) 2 Sheets—Sheet 2.

C. M. LUNGREN.
REGENERATIVE GAS LAMP.

No. 350,438. Patented Oct. 5, 1886.

Witnesses:
Ernest Abshagen
Chas Toomey

Inventor:
Charles M. Lungren
By his Attorney: H. C. Townsend

UNITED STATES PATENT OFFICE.

CHARLES M. LUNGREN, OF NEW YORK, N. Y., ASSIGNOR, BY MESNE ASSIGNMENTS, TO THE SIEMENS-LUNGREN COMPANY.

REGENERATIVE GAS-LAMP.

SPECIFICATION forming part of Letters Patent No. 350,438, dated October 5, 1886.

Application filed September 5, 1884. Serial No. 142,274. (No model.)

*To all whom it may concern:*

Be it known that I, CHARLES M. LUNGREN, a citizen of the United States, and a resident of New York, in the county of New York and State of New York, have invented certain new and useful Improvements in Regenerative Gas-Lamps, of which the following is a specification.

My invention relates to improvements in the construction of regenerative gas-lamps of the general form heretofore patented to me July 3, 1882, and patented June 24, 1884, No. 300,879, and refers more especially to the arrangement and relation of the various parts of the same. In the form of lamp referred to the distinguishing characteristics are the flame plate or surface arranged within and above the flame, and over which the flame from the burner sweeps, in combination with the air-supply passages for the flame, heated by said flame or the heated products of combustion. I have shown my present invention as embodied in one form of a lamp having these general characteristics; but at the same time it is to be understood that the features of novelty hereinafter claimed are alike applicable, and are designed for application to other forms of such lamp.

The lamp shown in the drawings, while being of the general form mentioned, is also shown as also embodying the feature of additional air-supply to the body of the flame, as claimed in my prior application, No. 136,052, filed June 26, 1884.

Figure 5:
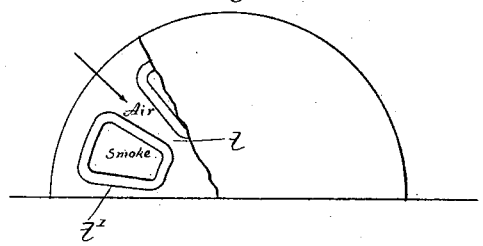
Figure 6:
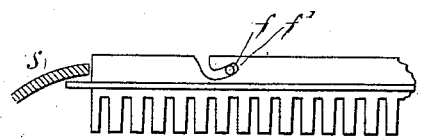

In the accompanying drawings, Figure 1 shows a hanging lamp embodying my invention, one half being shown in vertical section and the other half in elevation. Fig. 2 shows a variation of one feature of the lamp in vertical elevation. Fig. 3 shows in vertical section a form of the lamp arranged as a stand or table lamp. Figs. 4 and 5 illustrate in section and plan a modification of construction. Fig. 6 shows a detail of construction.

G, Fig. 1, indicates a gas supply pipe, from which depends an Argand burner, B, of any desired kind, connected to the pipe G by a number of separate pipes, between which latter air enters to the interior of the burner. The openings in the burner are formed in its lower end, or, preferably, on its outer surface, near the lower end. The burner hangs in the interior of an air-shell, A, the lower portion of which constitutes or has attached to it a flame plate or director, A', preferably of reflecting material, over the outer surface of which the flame is directed. A perforated disk, A'', serves to admit a proper proportion of air to the inner side of the flame. A portion of the air supplied to the interior of the shell A passes to the interior of the burner, and thence to the under side of the flame. Beneath the flame is a deflecting button or surface, substantially as shown in my prior Patent, No. 300,879. The air-shell A is connected with a regenerator, shown here as placed above the shell and supporting the same. Air passes through this regenerator to the shell, and is supplied to both sides of the flame, as indicated. The regenerator shown is composed of the inner and outer concentric shells, $r$ $r'$, connected by separated hollow cross-tubes $t$, the air passing through said cross-tubes, while the escaping products of combustion pass between them and heat the air. This apparatus might be formed of horizontal plates with vertical connecting-tubes passing through them, so that the products of combustion would pass through the tubes and the air around them, as shown in vertical section and plan in Figs. 4 and 5.

D indicates a shell depending from the shell $r$, or otherwise supported, which serves to deflect the flame inward away from the inclosing-glass and cause it to pass around the upper edge of the flame-surface A'. The lower or deflecting edge of the deflector extends down to or nearly to the tip of the flame, so as to act positively in turning the flame inward. This shell or deflector may be larger than the flame plate or surface, as shown in Fig. 1, or may be of the same or nearly the same diameter, as shown in Fig. 2. In this latter case the tips of the flame are deflected inward within the line of the circumference of the flame-plate. The globe E is hung from a holder, E', which may be removably attached to the outer shell, $r$. A number of fine openings in this holder admit a regulated amount of air to the outside of the flame, which aids in sweeping the flame inward to the interior of the shell D and toward the upper end of the flame-surface, thus promoting perfect combustion at the tips of the flame. The regenerator is set within the shell F, the upper portion of which forms the flue for the escaping products of combustion passing to the chimney C. From the lower end of shell F depends a perforated ring, F', through which the air to supply the flame passes, and by which it is broken up into a number of small currents. The ring F' may be made removable, and be supported on the shell F by means of a bayonet-joint, as shown at $ff'$, Fig. 6, or in any other desired manner, and serve for the support of the shade S, as shown in the same figure.

In the table-lamp shown in Fig. 3 the burner is preferably made without an air-passage through it, the air to supply the under side of the flame near the burner-tip being admitted through a casing, H, surrounding the gas-pipe G, by which the burner is supported, this pipe passing down into an ordinary table-standard, the top portion of which is shown in the figure. The whole apparatus rests upon the rod B', rising from the burner. The top of said rod enters a socket in the tripod or frame at the upper end of the shell A. The opening in the bottom of the globe E fits snugly around the tube H, and the diameter of the Argand burner is somewhat less than that of the tube. The whole apparatus, excepting the Argand burner and the base, may by this construction be lifted for the purpose of lighting the burner or for removing the globe for cleaning.

A burner constructed as described yields a white steady light of much greater intensity than that given by ordinary gas-flames consuming the same amount of gas.

What I claim as my invention is—

1. The combination of a burner, a flame plate or deflector arranged above the burner-tip and in close proximity to the burner, a second deflector independent of the outer shell or casing of the lamp, above the first and around its upper part, with a space between the same and the flame-plate, the said space forming an opening or passage for the escaping products of combustion, substantially as specified.

2. The combination of an annular burner having an air-passage through it, a flame plate or deflector above the burner-tip and in close proximity to the burner, and a second deflector independent of the outer shell or casing of the lamp, above the first and around its upper part, with a space between the same and the flame-plate, the said space forming the opening or passage for the escaping products of combustion.

3. The combination of an annular burner having an air-passage through it and a deflecting button or disk beneath it, a flame plate or deflector surrounding the burner and above its tip, and a second deflector independent of the outer shell or casing of the lamp, above or around the upper part of the flame-plate, with a space between it and the latter deflector, the said space forming the opening or passage for the escaping products of combustion.

4. The combination of a burner and an inclosing-globe with a flame plate or deflector located above the burner-tip, a second deflector independent of the outer shell or casing of the lamp, arranged above the first or around the upper part of the flame-plate, with a space between the same and the flame-plate for the escaping products of combustion, an air-passage leading from the outer air and opening just above the orifice of the burner, and an air-passage leading to and opening just below the orifice of the burner, substantially as specified.

5. The combination of a burner and inclosing-globe with a flame plate or deflector located above the burner-tip, a second deflector arranged above the first or around its upper part, with a space between the same and the flame-plate for the escape of the products of combustion, an air-passage leading from the outer air and opening just above the orifice of the burner, an air-passage leading to and opening just below the orifice of the burner, and an air-passage leading to and opening within the globe at or near its top, substantially as specified.

6. The combination of an annular burner having a deflecting button or disk below it, an inclosing-globe with a flame plate or deflector located above the burner-tip, a deflector arranged above the flame-plate or around its upper part, with a space between it and the flame-plate for the escape of the products of combustion, an air-passage leading from the outer air and opening just below the orifices of the burner, an air-passage leading to and opening just beneath the orifices of the burner, and an air-passage leading to and opening within the globe at or near its top, substantially as specified.

7. The combination, in a regenerative gas-burner, of a regenerator, a flame plate or deflector arranged above the burner-tip, a passage for the escaping products of combustion, an air-inlet passage, the outer wall of which forms a division between the two passages, and which wall is formed by the upwardly-directed flame-deflector, and a wall or flange extending downwardly from the regenerator, and an inclosing-globe, substantially as set forth.

8. The combination of a downwardly-directed gas-burner, a flame plate or deflector arranged above the burner-tip, a passage for the flames and escaping products of combustion arranged above the burner-tip, the walls of which extend down into the body of the inclosing-globe, an air-inlet passage, and an inclosing-globe, substantially as set forth.

9. The combination of a downwardly-directed gas-burner, a flame plate or deflector arranged above the burner-tip, a passage for the escaping products of combustion whose walls extend down into the body of the inclosing-globe, an air-inlet passage whose outer wall forms a division between the same and the passage for the escaping products of combustion, and an inclosing-globe, substantially as set forth.

10. The combination of a downwardly-directed gas-burner, a flame plate or deflector arranged above the burner-tip, a passage for the flames and escaping products of combustion, whose walls extend down into the body of the inclosing-globe, an air-inlet passage whose outer wall forms a division between the same and the passage for the flames and escaping products of combustion, and which wall is composed of the upwardly-directed burner-tip, a flange extending downwardly from the body of the lamp, and an inclosing globe, substantially as set forth.

11. In a regenerative gas-burner, a regenerator or central body-piece containing horizontal and vertical passages for the admission of air and the escape of products of combustion, respectively, a depending burner-tube, an outside perforated wall or casing, and an inclosing-globe, substantially as set forth.

12. The combination, in a regenerative gas-lamp, of a regenerator or central body-piece, a depending burner-tube, passages for the incoming air, and flues for the escaping products of combustion, a flame-plate surrounding the burner and the said air-passages, and a second flame plate or deflector above and surrounding the first, and also surrounding the escape-flues, and an inclosing-globe, substantially as and for the purpose described.

13. The combination of a gas-burner, an air-chamber located above the burner-tip and communicating at its upper end with an air-conduit leading to it from the outer air across the escape-flue, the lower end of said air-tube forming or having attached to it a flame plate or deflector, an inclosing-globe, and an escape-flue, the lower end of which surrounds the upper part of the air-chamber and extends down into the body of the globe, terminating at or near the upper edge of the flame plate or deflector, substantially as and for the purpose described.

14. The combination of an annular inverted gas-burner having an air-passage through it, an air-chamber surrounding the burner, the upper end of said air-chamber communicating with an air-conduit leading to it from the outer air across the escape-flue, the lower end of said air-chamber forming or having attached to it a flame plate or deflector, an inclosing-globe, and an escape-flue, the lower end of which surrounds the upper part of the air-chamber and extends down into the body of the inclosing-globe, terminating at or near the upper edge of the flame plate or deflector, substantially as and for the purpose specified.

Signed at New York, in the county of New York and State of New York, this 29th day of August, A. D. 1884.

CHARLES M. LUNGREN.

Witnesses:
   THOS. TOOMEY,
   JAS. F. DOYLE.